(No Model.)  2 Sheets—Sheet 2.
J. A. COULTER.
BAND CUTTER AND FEEDER.

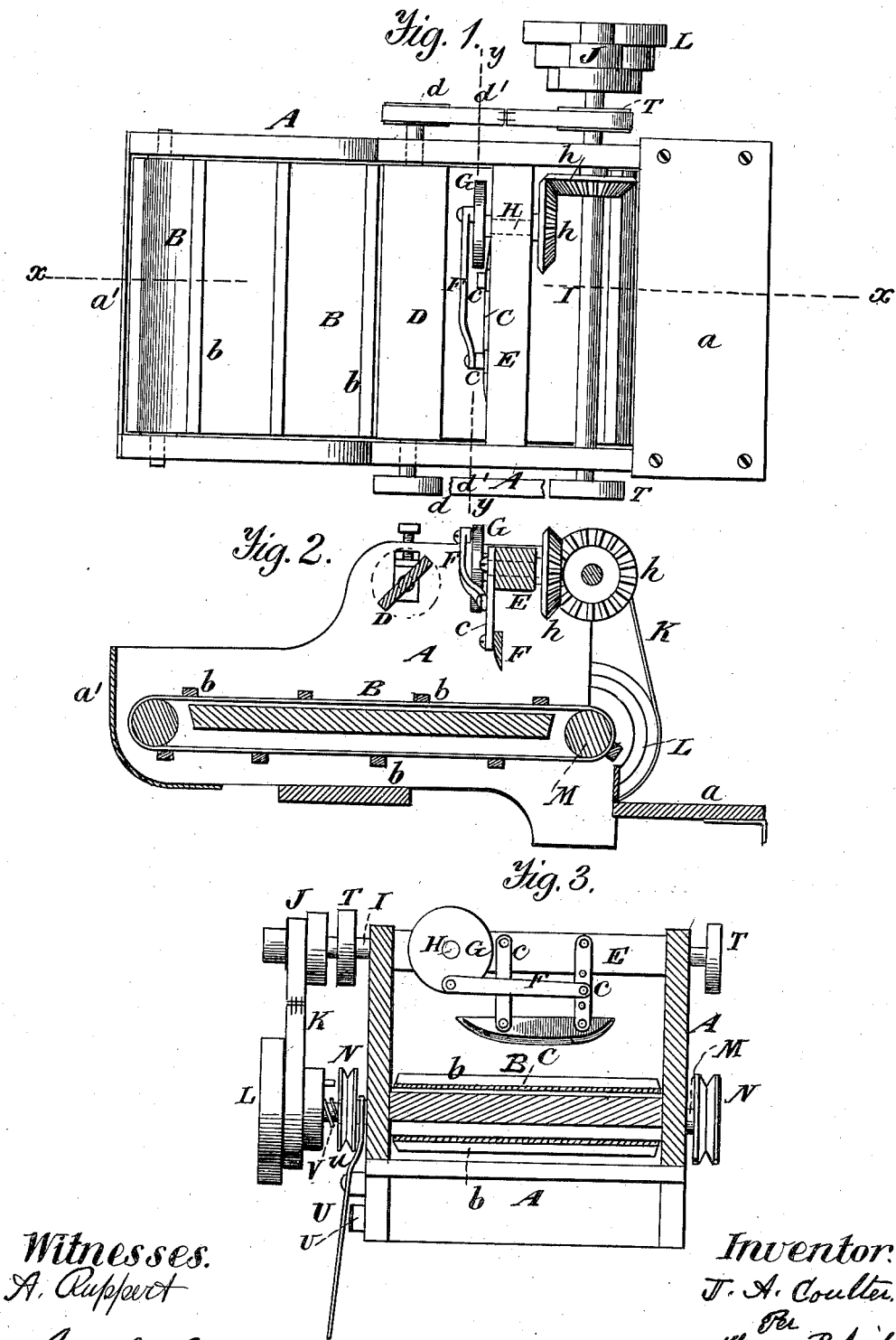

No. 343,985. Patented June 22, 1886.

Witnesses.
A. Ruppert.
G. H. Hess

Inventor.
J. A. Coulter,
Per
Thomas P. Simpson,
Atty.

UNITED STATES PATENT OFFICE.

JOHN ARTHUR COULTER, OF LEANNA, KANSAS.

BAND-CUTTER AND FEEDER.

SPECIFICATION forming part of Letters Patent No. 343,985, dated June 22, 1886.

Application filed February 26, 1886. Serial No. 193,309. (No model.)

*To all whom it may concern:*

Be it known that I, JOHN ARTHUR COULTER, a citizen of the United States, residing at Leanna, in the county of Allen and State of Kansas, have invented certain new and useful Improvements in Band-Cutters and Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claims.

Figure 5:
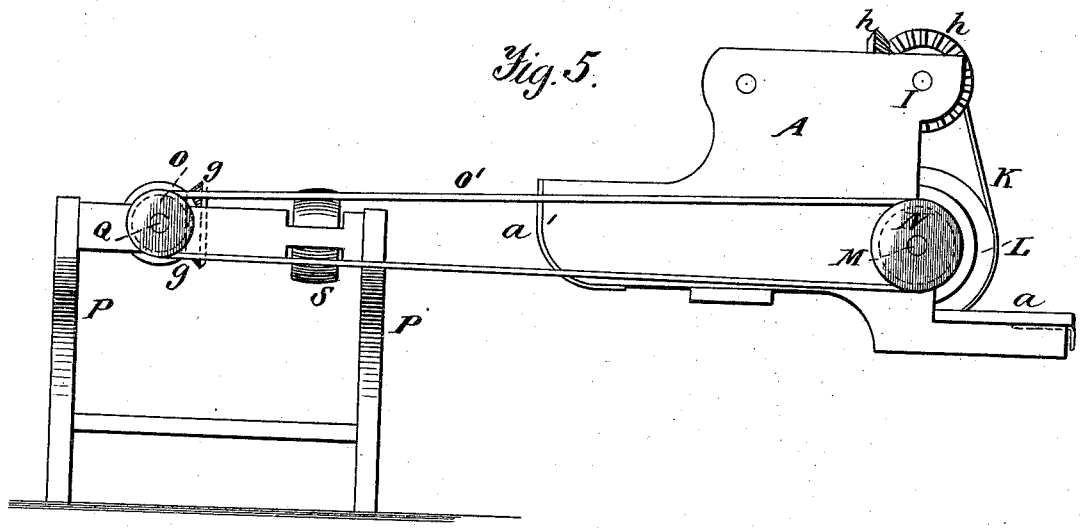
Figure 4:
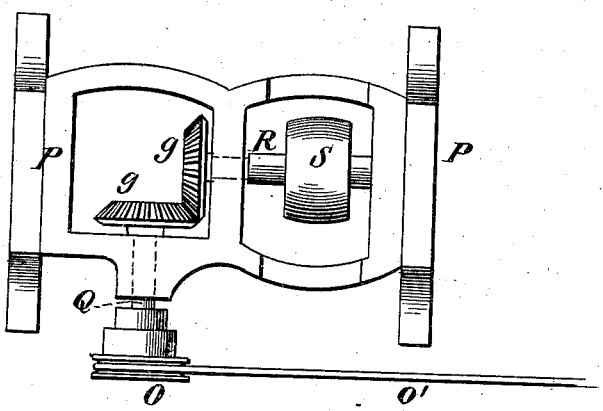

Figure 1 of the drawings is a top or plan view of the band-cutting mechanism; Fig. 2, a longitudinal vertical section on line $x\,x$ of Fig. 1; Fig. 3, a transverse vertical section on line $y\,y$ of Fig. 1; Fig. 4, a plan view of the frame which I employ to connect the steam-power with the band-cutting mechanism, and Fig. 5 is a side elevation of said frame.

In the drawings, A represents the band-cutter frame, which has in rear the platform $a$, on which the bundles are delivered for the convenience of the feeder, and at the front an inclosed space or receptacle, $a'$, into which the bundles are placed from the stack or barn. The bundles fall upon an endless apron, B, which carries them, by means of cross-bars $b$, directly under the transversely-swinging knife C, that cuts the bands, and then delivers them ready for the feeder on platform $a$. In order to keep the bundles as far as possible at right angles to the line of travel of the apron, and to prevent two bundles from passing one over the other under the oscillating knife, I arrange in front of the band-cutter the rotary beater D, which is journaled in opposite sides of the frame A.

The band-cutter C is suspended by the arms $c\,c$, pivoted to the superposed cross-bar E, as well as to the knife, and is connected by a pivoted pitman, F, to the wrist-pin of a disk, G. The latter is on a shaft, H, which is connected by cog-gears $h\,h$ to the shaft I, which is rotated by the fast pulley J. The pulley J is connected by a belt, K, with the fast multiple pulley L, which rotates with the shaft M. The latter carries the loose pulleys N N, which are grooved on their peripheries and connect one or the other, by a round belt with the corresponding pulley, O, on the frame P, or with the grooved wheel on the tumbling-shaft if horse power is used. The shaft Q, which carries pulley O, is connected by the cog-gears $g\,g$ with the shaft R, which carries the drum or drive pulley S. The frame P is staked down under the engine-belt, which drives the thrasher.

The extended ends of the beater D are provided with the pulleys $d\,d$, which are connected by belts $d'\,d'$ with the pulleys T T on the shaft I, so that the beater will be rotated whenever the band-cutter is at work. In practice the journals of the beater are made vertically adjustable in slots of the frame, so that it may be graduated in height to suit any size of bundles.

The lever U is crooked at $u$ and bifurcated at the front end, so as to straddle the shaft; hence, when pressed at the power end toward the frame, it will cause the pulley N to clutch with the multiple pulley L. It is then held in a suitable catch, $v$, on the frame while all the mechanism is moving; but as soon as the lever is unlatched a spring, V, between the pulleys L N on the shaft throws the pulleys out of clutch. Of course the same pulleys, clutch devices, and lever are on both sides of the frame, so that no matter how the band-cutter may stand with respect to the stack and thrasher the cutter and beater may be operated with equal facility. Thus it will be observed that by a single stroke of the hand on the lever U either of the loose sliding pulleys N N may be thrown out of clutch with either of the fast pulleys L on shaft M, and the band-cutter thrown out of gear with the power.

What I claim as new, and desire to protect by Letters Patent, is—

1. The combination, with the knife C, cross-bar E, rotary disk G, pitman F, and shaft H, of the pivoted rods $c\,c$, hung from said cross-bar, carrying said knife, and one of them connecting with the said pitman, as and for the purpose specified.

2. In a band-cutter, the combination, with the rotary disk G, band-cutter, and intermediate connections, of the shaft H, cog-wheels $h\ h$, shaft I, pulley J, belt K, shaft M, and pulley N, as and for the purpose set forth.

3. The combination, with the endless apron B, shaft M, and pulley N, of the belt O', pulley O, gear-wheels $g\ g$, shaft R, and pulley S, as and for the purpose set forth.

4. The combination, with the beater D and its shaft, of the pulleys $d\ d$, belts $d'\ d'$, pulleys T T, and shaft I, as and for the purpose specified.

In testimony whereof I affix my signature in presence of two witnesses.

JOHN ARTHUR COULTER.

Witnesses:
   J. E. COULTER,
   T. C. MORROW.